Patented Dec. 25, 1945

2,391,847

UNITED STATES PATENT OFFICE 2,391,847

5-NITROHEXAHYDROPYRIMIDINES AND PROCESS FOR PREPARATION THEREOF

Murray Senkus, Terre Haute, Ind.

No Drawing. Application July 29, 1944,
Serial No. 547,281

12 Claims. (Cl. 260—251)

My invention relates to a new series of nitrogen-containing compounds. More particularly it relates to 5-nitrohexahydropyrimidines and to a process for the preparation thereof. The compounds of my invention may be represented by the following general structural formula:

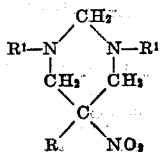

in which R may be alkyl, aryl, hydroxymethyl or hydrogen and $R^1$ represents either alkyl, aralkyl, aryl, 2-hydroxyalkyl, dialkylaminoalkyl, furfuryl, or 3,5-dioxacyclohexyl.

According to my invention, these 5-nitrohexahydropyrimidines may be readily prepared by first adding formaldehyde to a cooled solution of the required amine to produce the corresponding N-hydroxymethylamine, the formaldehyde being preferably added in a ratio of three moles of formaldehyde to two of amine. This reaction is generally quite exothermic in nature and it is usually desirable to cool the reaction vessel with ice or other suitable means, particularly if volatile low molecular weight amines are employed. When the reaction has subsided, a suitable nitrohydrocarbon having the nitro group attached to a primary carbon atom is added in a molar concentration equivalent to approximately one-half of that of the amine. After all of the nitrohydrocarbon has been introduced, the reaction mixture is generally heated to about 70° C. in order to drive the reaction to completion. Upon completion of the reaction, the 5-nitrohexahydropyrimidines which separate from the reaction mixture as solids can be readily purified by recrystallization from a suitable solvent such as petroleum ether, methanol or water, the choice of solvent depending on the molecular weight of the 5-nitrohexahydropyrimidine to be recrystallized. Frequently it is necessary or desirable to dissolve the crude solid and heat the resulting solution in the presence of decolorizing charcoal, prior to the recrystallization step. Such treatment results in the procurement of a substantially pure product. The liquid 5-nitrohexahydropyrimidines may be separated from the water layer and water soluble impurities, shaken again with water, separated, and dried over a suitable drying agent such as anhydrous sodium sulfate or anhydrous calcium sulfate.

A modified and frequently preferred procedure for preparing the 5-nitrohexahydropyrimidines of my invention involves mixing a nitro glycol with a suitable primary amine, the two materials being preferably brought together in a ratio of two moles of amine to one of nitro glycol. Under these conditions, the nitro glycol dissociates into the parent nitrohydrocarbon and formaldehyde, thus resulting in the formation of a reaction mixture containing an amine, a nitrohydrocarbon, and formaldehyde. In the case of aromatic amines a small quantity of catalyst, such as 50% aqueous sodium hydroxide, should be employed. Thereafter, formaldehyde in the form an aqueous solution, or trioxymethylene, is added to the mixture in an amount corresponding approximately to the molecular quantity of nitro glycol present. Upon completion of the reaction the product is purified in accordance with the methods outlined above.

Since both of the above described procedures result in the formation of identical products, and since both fundamentally involve reaction mixtures containing formaldehyde, a primary amine, and a nitrohydrocarbon having the nitro group attached to a primary carbon atom, it may be seen that the reactions occurring therein are in all essential respects equivalent. It is therefore to be specifically understood that the terminology employed in certain of the appended process claims is to be construed to cover both of the foregoing modifications.

While I have indicated above that it is desirable to use at least three moles of formaldehyde for each mole of nitrohydrocarbon in the preparation of the compounds of my invention, it is possible to effect the desired reaction by employing lower proportions of formaldehyde, such as for example two moles for each mole of nitrohydrocarbon. The yields of 5-nitrohexahydropyrimidine obtained, however, under such conditions are lower.

Reaction temperatures may be employed ranging from about 25–30° C. to reflux temperature of the reaction mixture, the selection of temperature being dependent largely on the particular process utilized and the molecular weight of the primary amine employed. It may be mentioned, however, that reaction between substantially any amine and nitrohydrocarbon may be effected at room temperature in the presence of formaldehyde if the reactants are permitted to remain in contact with one another for a sufficient period of time.

The reaction generally can be effected in the absence of a solvent. However, I have found it preferable in most instances to employ a suitable solvent such as benzene or a lower aliphatic alcohol, for example, methanol.

Any primary amine, aliphatic or aromatic, can be employed in my process and the structure of any particular amine utilized may vary widely. For instance, in addition to the utilization of any of the common aliphatic or aromatic amines such as methylamine, ethylamine, butylamine, aniline, naphthylamine, and the like, I may also employ with equal success certain aromatic diamines, such as N-(2-aminoisobutyl)-N-methyl-o-chloroaniline, N-(2-aminoisobutyl)-N-methylaniline, N-(2-aminoisobutyl)-N-methyl-m-toluidine, N-(2-aminoisobutyl)-N-ethyl-p-aminobenzoic acid, and N-(2 - aminoisobutyl) - N - methylsulfanilic acid, and aliphatic diamines, such as N-(2-aminoisobutyl) dimethylamine, N-(2 - aminoisobutyl) isopropylmethylamine, N-(2-aminoisobutyl)-bis-(1-methylhexyl)amine, N - (2-aminoisobutyl-dioctadecyl)amine, N-(2 - aminoisobutyl)benzylmethylamine, N-(2-aminoisobutyl)-N-(1-phenylethyl)methylamine, N - (2 - aminoisobutyl)cyclohexylmethylamine, N-(2 - aminoisobutyl)-N - (1 - methylcyclohexyl)methylamine, 5-amino-3-benzyl-2,2,5-trimethyl-3-aza-1-hexanol, N-(2-aminoisobutyl) - bis - (tetrahydrofurfuryl) amine, N-(2 - aminoisobutyl) difurfurylamine, N-(2-aminoisobutyl) piperidine, N - (2-aminoisobutyl)-2,5-dimethylpyrrolidine, N - (2-aminoisobutyl) morpholine, and the like.

The group of amines which I have designated as aromatic diamines may be conveniently prepared by catalytic reduction of the corresponding nitro amines under pressure, as described in copending application, U. S. Serial No. 459,447, filed September 23, 1942 by Harold G. Johnson. The nitro amines employed as starting materials for the synthesis of the aforesaid aromatic diamines may be prepared in accordance with the procedure described in copending application, U. S. Serial No. 473,523, filed January 25, 1943, by Harold G. Johnson. According to this procedure, a secondary aromatic amine is reacted with a suitable mono- or dihydric primary nitro alcohol in the presence of a basic catalyst, such as for example, sodium hydroxide, tributylamine, triethylamine, or benzylammonium hydroxide at a temperature of approximately 50° C.

The amines designated above as aliphatic diamines can readily be synthesized by catalytically reducing the corresponding nitro amines under pressure in accordance with the procedure described and claimed in my copending application, U. S. Serial No. 455,932, filed August 24, 1942. The nitro amines utilized as starting materials may be synthesized in accordance with the procedure described in my copending application, U. S. Serial No. 455,931, filed August 24, 1942. By this procedure, a secondary aliphatic amine is reacted with formaldehyde to form the corresponding N-hydroxymethyl mono- or dialkyl amine, which is in turn reacted with an equimolecular quantity of a secondary nitroparaffin to produce the desired nitro amine. The preparation of such nitro amines is preferably carried out at temperatures of from between about 25–30° C. Temperatures above this range may be utilized but in doing so care should be exercised to avoid temperatures which cause the formaldehyde to be volatilized from the reaction mixture.

As examples of suitable nitrohydrocarbons which may be employed in my process, there may be mentioned nitromethane, nitroethane, 1-nitropropane, 1-nitrobutane, phenylnitromethane, and the like.

The process of my invention may be more specifically illustrated by the representative examples which follow:

*Example I*

To 472 g. of 5-amino-5-methyl-1,3-dioxane (4 moles) was added in one portion 450 ml. of 36% (by wt.) aqueous formaldehyde (6 moles). The mixture was stirred. In a few minutes the temperature of the mixture rose to 60°, and then began to fall slowly. To this solution, 150 g. of nitroethane (2 moles) was added in one portion and the mixture was again stirred to obtain homogeneity. The temperature of the mixture rose to 90° after three to four minutes. The vessel which contained the mixture was immersed in water in order to lower the temperature of the mixture to about 70° and thus avoid a possible loss of nitroethane. The product began to crystallize in about thirty minutes. The mixture was allowed to stand at room temperature for about twenty hours. The product was isolated by filtering the mixture on a Buchner funnel and then it was dried in the air for twenty hours. The dried white crystalline product weighed 630 g. It was purified by recrystallization from water; M. P. 151.8° C.

Analysis: Calculated for $C_{15}H_{27}N_3O_6$: C, 52.17; H, 7.85.

Found: C, 52.02; H, 7.66

*Example II*

A mixture consisting of 20 g. of 2-nitro-2-phenyl-1,3-propanediol, 6 g. of methylamine in the form of a 31% aqueous solution (20 ml.), and 7.5 ml. of 36% aqueous formaldehyde (3 g.) was heated to a temperature of about 80° on a steam bath for one hour. Thereafter 500 ml. of benzene was added and the mixture evaporated until it became homogeneous. To the homogeneous mixture was then added with agitation 3 g. of charcoal, after which the latter was removed by filtration. The filtrate was next placed on the steam bath to evaporate off the benzene. The residue thus obtained consisted chiefly of crude 5-nitro-5-phenyl-1,3-dimethylhexahydropyrimidine. To this residue was next added 400 ml. of petroleum ether and the mixture heated to boiling, after which it was allowed to stand overnight at room temperature. On filtration, 17 g. of yellow, waxy crystals were obtained. These were then recrystallized twice from petroleum ether yielding 11 g. of white crystalline 5-nitro-5-phenyl-1,3-dimethylhexahydropyrimidine melting at 97.4° C.

Analysis: Calculated for $C_{12}H_{17}N_3O_2$: C, 61.28; H, 7.23.

Found: C, 61.24; H, 7.24.

*Example III*

A mixture consisting of 34 g. of 2-nitro-2-methyl-1,3-propanediol, 10 ml. of 36% aqueous formaldehyde, and 93 g. of 3-dibutylaminopropylamine was allowed to stand at room temperature for a period of five days. Thereafter the oily product layer was separated and dried over 20 g. of anhydrous sodium sulphate, after which it was filtered and the filtrate thus obtained was further dried with 20 g. of anhydrous calcium sulphate. After standing in contact with the anhydrous calcium sulphate over night, there was obtained on filtration 122 g. of 5-nitro-5-methyl-1,3-bis(3-dibutylaminopropyl) - hexahydropyrimidine.

Analysis: Calculated for $C_{27}H_{57}N_5O_2$: N, 14.49. Found: N, 14.36. $n_D^{20}$, 1.4739; $d_{20}^{20}$, 0.9386.

The following data were determined for certain 5-nitrohexahydropyrimidines of my invention prepared in accordance with the various procedures outlined above.

TABLE

| Amine | Nitroparaffin | 5-nitrohexahydropyrimidine | M. P., °C | $d_{20}^{20}$ | $n_D^{20}$ | Carbon Calc. | Carbon Found | Hydrogen Calc. | Hydrogen Found | Nitrogen Calc. | Nitrogen Found |
|---|---|---|---|---|---|---|---|---|---|---|---|
| Benzylamine | Nitroethane | 5-nitro-1,3-dibenzyl-5-methyl-hexahydropyrimidine. | 113.5 | | | 70.15 | 69.05 | 7.07 | 6.92 | | |
| Do | 1-nitropropane | ....do.... | 93.7 | | | 71.09 | 70.33 | 7.37 | 7.02 | 12.39 | 12.41 |
| Methylamine | Nitromethane | 5-nitro-1,3-dimethyl-5-hydroxymethylhexahydropyrimidine. | 121 | | | 44.44 | 44.57 | 7.94 | 7.91 | | |
| Do | Nitroethane | 5-nitro-1,3,5-trimethylhexahydropyrimidine. | 48.6 | | | | | | | | |
| Do | 1-nitropropane | 5-nitro-1,3-dimethyl-5-ethyl hexahydropyrimidine. | 38.5 | | | 51.34 | 51.21 | 9.09 | 8.88 | | |
| Do | Phenylnitromethane | 5-nitro-1,3-dimethyl-5-phenyl-hexahydropyrimidine. | 97.4 | | | 61.28 | 61.18 | 7.23 | 7.16 | | |
| Isopropylamine | Nitromethane | 5-nitro-1,3-diisopropylhexahydropyrimidine. | 77 | | | 55.82 | 56.34 | 9.82 | 9.65 | | |
| Do | ....do.... | 5-nitro-1,3-diisopropyl-5-hydroxymethylhexahydropyrimidine. | 137 | | | 53.88 | 54.29 | 9.38 | 9.10 | | |
| Do | Nitroethane | 5-nitro-1,3-diisopropyl-5-methylhexahydropyrimidine. | 40.9 | | | 57.64 | 58.09 | 10.04 | 9.79 | | |
| 1-methylheptylamine | ....do.... | 5-nitro-1,3-bis(1-methylheptyl)-5-methylhexahydropyrimidine. | [1]140.5 | | | | | | | [2]16.05 | [2]16.47 |
| 3-dimethylamino-2,2-dimethylpropylamine. | ....do.... | 5-nitro-1,3-bis(3-dimethylamino-2,2-dimethylpropyl)-5-methylhexahydropyrimidine. | | 0.9511 | 1.4720 | | | | | 17.90 | |
| 3-dibutylaminopropylamine. | ....do.... | 5-nitro-1,3-bis(3-dibutylaminopropyl)-5-methylhexahydropyrimidine. | | 0.9386 | 1.4739 | | | | | 14.49 | 14.36 |
| 2-amino-2-methyl-1-propanol. | ....do.... | 5-nitro-1,3-bis(1,1-dimethyl-2-hydroxyethyl)-5-methyl-hexahydropyrimidine. | 124 | | | 53.98 | 53.68 | 9.41 | 9.06 | | |
| 5-amino-5-methyl-1,3-dioxane. | ....do.... | 5-nitro-1,3-bis(1-methyl-3,5-dioxacyclohexyl)-5-methylhexahydropyrimidine. | 151.8 | | | 52.17 | 52.02 | 7.83 | 7.66 | | |
| Do | 1-nitropropane | 5-nitro-1,3-bis(1-methyl-3,5-dioxacyclohexyl)-5-ethylhexahydropyrimidine. | 105.6 | | | 53.48 | 51.76 | 8.36 | 7.95 | | |
| Aniline | Nitroethane | 5-nitro-1,3-diphenyl-5-methylhexahydropyrimidine. | 68.2 | | | 68.62 | 68.57 | 6.39 | 6.28 | | |
| Furfurylamine | ....do.... | 5-nitro-1,3-difurfuryl-5-methylhexahydropyrimidine. | [3]179.1 | | | | | | | [4]15.73 | [4]16.45 |

[1] N.P. of dihydrochloride.
[2] Cl content of dihydrochloride.
[3] M.P. of picrate.
[4] N content of picrate.

The 5-nitrohexahydropyrimidines of the type illustrated and discussed above are useful in the preparation of numerous valuable organic compounds. Additional uses of these materials will be apparent to those skilled in the art.

My invention now having been described, what I claim is:

1. A process for the preparation of 5-nitrohexahydropyrimidines, which comprises bringing a primary amine into reaction with a nitrohydrocarbon having a nitro group attached to a primary carbon atom, in the presence of formaldehyde, the latter being employed in a ratio of at least two moles to one of nitrohydrocarbon and two moles of primary amine.

2. A process for the preparation of 5-nitrohexahydropyrimidines, which comprises bringing a primary amine into reaction with a nitrohydrocarbon having a nitro group attached to a primary carbon atom, in the presence of formaldehyde, the latter being employed in a ratio of at least three moles to one of nitrohydrocarbon and two moles of primary amine.

3. A process for the preparation of 5-nitrohexahydropyrimidines, which comprises adding formaldehyde to a primary amine to produce the corresponding N-hydroxymethylamine, and thereafter adding to the resulting mixture a nitrohydrocarbon having the nitro group attached to a primary carbon atom, the formaldehyde being added in a ratio of at least three moles to one of nitrohydrocarbon and two moles of primary amine.

4. A process for the preparation of 5-nitrohexahydropyrimidines, which comprises mixing a primary amine with a 2-nitro-1,3-propanediol in a molecular ratio of approximately two moles of said amine to one of 2-nitro-1,3-propanediol in the presence of formaldehyde, the remainder of the formaldehyde required for the preparation of the desired 5-nitrohexahydropyrimidine being furnished by the decomposition of said 2-nitro-1,3-propanediol into formaldehyde and a nitrohydrocarbon having the nitro group attached to a primary carbon atom.

5. A process for the preparation of 5-nitrohexahydropyrimidine, which comprises mixing a primary amine with a 2-nitro-1,3-propanediol in a molecular ratio of approximately two moles of said amine to one of 2-nitro-1,3-propanediol in the presence of at least one mole of formaldehyde, the remainder of the formaldehyde required for the preparation of the desired 5-nitrohexahydropyrimidine being furnished by the decomposition of said 2-nitro-1,3-propanediol into formaldehyde and a nitrohydrocarbon having the nitro group attached to a primary carbon atom.

6. The process of claim 3 in which the nitrohydrocarbon is 1-nitropropane and the primary amine is benzylamine.

7. The process of claim 4 in which the 2-nitro-1,3-propanediol is 2-nitro-2-phenyl-1,3-propanediol and the primary amine is methylamine.

8. The process of claim 4 in which the 2-nitro-1,3-propanediol is 2-nitro-2-methyl-1,3-propanediol and the primary amine is 3-dibutylaminopropylamine.

9. As new compositions of matter, 5-nitrohexahydropyrimidines.

10. 5-Nitro-5-methyl-1,3-bis-(3-dibutylaminopropyl)hexahydropyrimidine.

11. 5-Nitro-5-phenyl-1,3-dimethylhexahydropyrimidine.

12. 5-Nitro-1,3-diisopropylhexahydropyrimidine.

MURRAY SENKUS.